United States Patent
Kim et al.

(10) Patent No.: US 7,076,167 B2
(45) Date of Patent: Jul. 11, 2006

(54) OPTICAL NETWORK UNIT

(75) Inventors: Dong-Seon Kim, Seoul (KR);
Yong-Hoe Kim, Anyang (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 709 days.

(21) Appl. No.: 10/214,317

(22) Filed: Aug. 8, 2002

(65) Prior Publication Data

US 2003/0099012 A1    May 29, 2003

(30) Foreign Application Priority Data

Nov. 29, 2001  (KR) .............................. 2001-75073

(51) Int. Cl.
*H04J 14/00* (2006.01)

(52) U.S. Cl. ............................ 398/58; 398/60; 398/70; 398/164

(58) Field of Classification Search .................. 398/58, 398/60, 70, 164; 370/294, 352
See application file for complete search history.

(56) References Cited

OTHER PUBLICATIONS

"*600 Mbps 150 Mbps Asymmetric ATM-PDS Transmission Equipment for ATM Video Services and ISDN*," by Ichibangase et al., in Technical Report of IEICE vol. No. CS97-29, pp. 13-18.

"*Instant Transfer of Huge Contents on an Optical Subscriber Network*", by Yoshikawa et al., in Technical Report of IEICE vol. No. CS96-33, pp. 9-14.

*Primary Examiner*—David C. Payne
(74) *Attorney, Agent, or Firm*—Robert E. Bushnell, Esq.

(57) ABSTRACT

The present invention includes an optical network unit ONU, connected to a backbone network including a host digital terminal HDT and a digital subscriber line access multiplexor DSLAM of a high-speed data service system, and connected to multiple subscribers, for performing subscriber concentration functions, while the ONU includes a common unit board CUB, interfaced with the backbone network, for extracting an ATM cell, performing a full-duplex ATM cell processing function, performing a transmission test for the ATM cell and associated data, and controlling mutual operations among each of the unit boards and data flows; multiple xDSL service unit boards for performing a subscriber interface after converting the ATM cell from the CUB to an analog signal and thereof, for dividing the ATM cell into a high frequency component for data area and a low frequency component for a voice area, and for transmitting the ATM cell to the subscribers, or vice versa; and a shelf including multiple slots for plugging-in multiple unit boards, and for linking the packaged unit boards with a common bus in the shelf.

17 Claims, 6 Drawing Sheets

OPTICAL NETWORK UNIT

CLAIM OF PRIORITY

This application makes reference to, incorporates the same herein, and claims all benefits accruing under 35 U.S.C. §119 from my application entitled APPARATUS FOR OPTIC NETWORK UNIT earlier filed with the Korean Industrial Property Office on 29 Nov. 2001 and there duly assigned Serial No. 75073/2001.

BACKGROUND OF THE INVENTION

1. Field of the Invention

The present invention relates to an optical network unit ONU linking a multi-functional common unit board installed in a shelf, and to a service unit board for a multiple digital subscriber line xDSL and for a plain old telephone service POTS through a common bus.

2. Description of the Related Art

Recently, according to the variety of data communication services and explosive increases in the demands of data communication services, subscribers accustomed to the data transmission of low and middle speeds, such as voice data transmission, are beginning to request a wide area network WAN capable of providing a high-speed digital data transmission service, such as multimedia data transmissions.

Therefore, many technologies have been developed to provide such a high speed digital data service. Two standards capable of providing a high-speed digital data transmission service among the developed technologies are a fiber to the curb (FTTC) technology and a fiber to the home (FTTH) technology.

The FTTC technology is applied when optical fiber cables are installed from a public network to the front door of each home of the subscribers. In this case, the curbs are located in each of the densely inhabited districts of the subscribers respectively, and optical transmissions are performed through the optical fiber cables from a switching apparatus in the public network to the curbs. Furthermore, data is transmitted through conventional telephone lines from the curb to each of the corresponding subscribers.

On the other hand, the FTTH technology sets the curb inside each home of the subscribers, respectively.

A fiber loop carrier-curb FLC-C system for embodying the above described FTTC technology receives WAN data, such as a digital service level 1 DS1 of 1.544 Mbps (megabits per second), a digital service 1 Europe DS1E of 2.048 Mbps, a digital service level 3 DS3 of 51.48 Mbps, an integrated service digital network ISDN, or 10 Base_T, or vice versa. Moreover, the FLC-C system performs a synchronous optical transmission, such as a synchronous transfer level-1 STM-1 or a synchronous transfer level-4 STM-4, and inverse-multiplexes the WAN data to be transmitted to the subscriber, or vice versa.

A network configuration in the conventional FLC-C system generally includes a host digital terminal HDT, and multiple optical network units ONUs. Normally, the HDT is installed in a main body for managing and controlling the FLC-C system, such as a central office CO, and the ONU is installed in densely inhabited districts of subscribers, such as multiple curbs.

The HDT is connected into a public switched telephone network PSTN or an asynchronous transfer mode ATM. After receiving the data through the PSTN or the ATM network, the HDT performs a synchronous optical transmission to the ONU, or vice versa. The ONU inverse-multiplexes the optical data signal transmitted from the HDT, and provides a high speed asynchronous transmission channel having a download speed of 1.5~6 Mbps (or 2~8 Mbps in E1) and an upload speed of 16~24 Kbps (kilobits per second) for each of the subscribers through a telephone line, or vice versa.

As described in the above statement, the ONU is one of the subscriber control units for providing an interface and a concentration function in data transmissions for the subscribers, while a backbone network includes the HDT (sometimes, the ONU is connected into a digital subscriber line access multiplexor DSLAM instead of directly connecting to the HDT). Furthermore, because so many ONUs have to be installed for the FLC-C system, economical efficiency is one of the most important factors to be considered.

As a preceding technology, the article, "600 Mbps 150 Mbps Asymmetric ATM-PDS Transmission Equipment for ATM Video Service and ISD", in Technical Report of IEICE Vol. No CS97-29 by Hiroshi Ichibangase discloses a subscriber control unit including an optical signal processor and a packet driver specification PDS for connecting to a public network, an ATM multiplexor, an ATM cell assembler, and a subscriber interface terminal for connecting a cable TV (television) CATV and for transmitting a video data. In this article, the subscriber control unit provides standard functions such as an ATM multiplexor and an ATM cell assembler for performing ATM cell functions.

Further, the article, "Instant Transfer of Huge Contents on an Optical Subscriber Network", in Technical Report of IEICE Vol. No CS96-33 by Tara Yoshikawa discloses a subscriber control unit including a function unit, such as an ATM physical interface ATM-PHY, for connecting a public network. In this article, the subscriber control unit provides various kinds of customer premises network CPN including a digital signal processor DSP, a field programmable gate array FPGA, and so on. These units transmit data through a common bus.

The subscriber control unit described in the above articles, focuses only on economical efficiency so that the ONU can perform minimum functions. On the contrary, the recent trends in development of WAN data services request a network unit with high speed and large capacity, such as an interactive service based on multimedia, for numerous subscribers. Therefore, it is required to develop an inexpensive ONU with high speed and large capacity.

In other words, it is required to develop an ONU having flexibility and expandability according to densely inhabited districts of the subscribers and requested speed degrees of data services, while the ONU keeps economical efficiency.

SUMMARY OF THE INVENTION

It is therefore an object of the preferred embodiments of the present invention to provide an inexpensive optical network unit ONU having integrated and simplified configuration.

It is another object to provide an optical network unit ONU that performs multi-functions through various interfaces and has better flexibility and expandability in the configuration.

In order to achieve the above and other objects, the preferred embodiments of the present invention provide an optical network unit ONU, connected to a backbone network including a host digital terminal HDT and a digital subscriber line access multiplexor DSLAM of a high-speed data service system, and connected to multiple subscribers, for performing subscriber concentration functions, while the ONU includes a common unit board CUB, interfaced with the backbone network, for extracting an ATM cell, performing a full-duplex ATM cell processing function, performing a transmission test for the ATM cell and associated data, and controlling mutual operations among each of the unit boards and data flows; multiple xDSL service unit boards for performing a subscriber interface after converting the ATM cell from the CUB to an analog signal and thereof, for dividing the ATM cell into a high frequency component for data area and a low frequency component for a voice area, and for transmitting the ATM cell to the subscribers, or vice versa; and a shelf including multiple slots for plugging-in multiple unit boards, and for linking the packaged unit boards with a common bus in the shelf.

Furthermore, two CUBs are packaged in the shelf for duplication and one to three xDSL service unit boards are variably packaged in the shelf according to the density degree of the connected subscribers.

Moreover, the common bus includes an ATM cell bus for exchanging the ATM cell between the CUB and the multiple xDSL service unit boards; and a test bus for exchanging a test data among the service unit boards.

In addition, the ONU further includes a plain old telephone service POTS service unit board for performing a subscriber interface after converting a voice time-division multiplexing TDM signal from the CUB to an analog signal, and for transmitting the signal to the subscribers, or vice versa.

In addition, the POTS service unit board includes 64 subscriber connecting ports for controlling 64 channels.

Furthermore, the common bus further includes a TDM bus for exchanging the voice TDM signal for POTS services between the CUB and the POTS service unit board.

In addition, the common bus further includes a TDM bus for exchanging the voice TDM signal for POTS services between the CUB and the POTS service unit board.

Moreover, the CUB is connected to the backbone network through one of the interfaces.

In addition, the interface is one of STM-1, SHDSL, IMA, DS3 and E1/T1.

Further, the CUB includes a universal network interface module including multiple network connecting ports connected to the backbone network through optical cables, and for performing a function of an optical/electric (optical to electrical or electrical to optical) interface and the ATM cell extraction to transmit full-duplex data signal to the backbone network; a cell processor module for exchanging mutually the ATM cell with the universal network interface module, for multiplexing the voice TDM signal including full-duplex ATM cell and POTS service data or vice versa, for converting an ATM header for virtual path connection VPC of the full-duplex ATM cell, for managing the full-duplex ATM cell traffic, and for performing a function of a real time operation, administration and maintenance OAM for the full-duplex ATM cell; a cell router for transmitting the ATM cell from the cell processor module to the ATM cell bus, or vice versa; a test module for selecting a transmission path for the ATM cell and associated data, for applying a test signal to the selected path, and for comparing the test results with presetting values of each of the test items to decide whether the transmission path is operated in normal or not; and a control module for controlling mutual operations among the modules, and transmission flows of the full-duplex ATM cell and associated data, wherein the modules are an integrated chip.

In addition, the universal network interface module of the CUB, including connecting ports for connecting another ONU as a sub unit, is connected to the sub unit through the connecting ports by the network topology of daisy chain method.

Furthermore, the shelf has a width of 19 inches, a height of 132 mm (millimeters), and a depth of 427.7 mm.

In addition, the shelf has a width of 19 inches, a height of 88 mm, and a depth of 427.7 mm.

In addition, the xDSL service unit board includes 32 subscriber connecting ports for controlling 32 channels.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
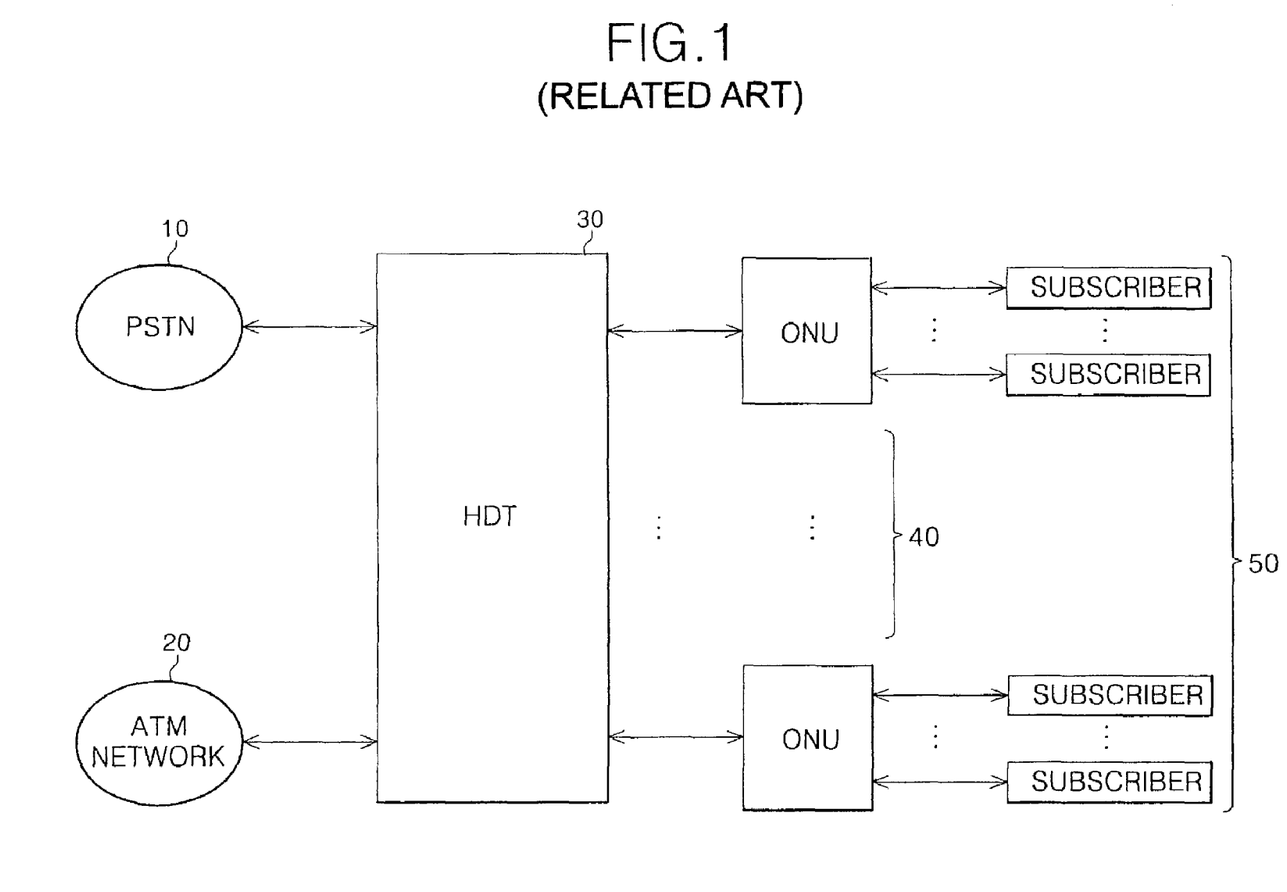
FIG. 1 is a schematic diagram of the network configuration in the conventional FLC-C system.

Turning now to the drawings, FIG. 1 is a schematic diagram of the network configuration in the conventional FLC-C (fiber loop carrier-curb) system.

Referring to FIG. 1, the FLC-C system generally includes a host digital terminal HDT 30, and multiple optical network units ONUs 40. Normally, the HDT 30 is installed in a main body for managing and controlling the FLC-C system, such as a central office CO, and the ONU 40 is installed in densely inhabited districts of subscribers 50, such as multiple curbs.

The HDT 30 is connected into a public switched telephone network PSTN 10 or an asynchronous transfer mode ATM network 20. After receiving the data through the PSTN 10 or the ATM network 20, the HDT 30 performs a synchronous optical transmission to the ONU 40, or vice versa. The ONU 40 inverse-multiplexes the optical data signal transmitted from the HDT 30, and provides a high speed asynchronous transmission channel having a download speed of 1.5~6 Mbps (or 2~8 Mbps in E1 (European digital line)) and an upload speed of 16~24 Kbps for each of the subscribers 50 through a telephone line, or vice versa.

As described in the above statement, the ONU 40 is one of the subscriber control units for providing an interface and a concentration function in data transmissions for the subscribers 50, while a backbone network includes the HDT 30 (sometimes, the ONU 40 is connected into a digital subscriber line access multiplexor DSLAM instead of directly connecting to the HDT). Furthermore, because so many ONUs 40 have to be installed for the FLC-C system, economical efficiency is one of the most important factors to be considered.

Reference will now be made in detail to the preferred embodiments of the present invention, an example of which is illustrated in the accompanying drawings.

Figure 2:
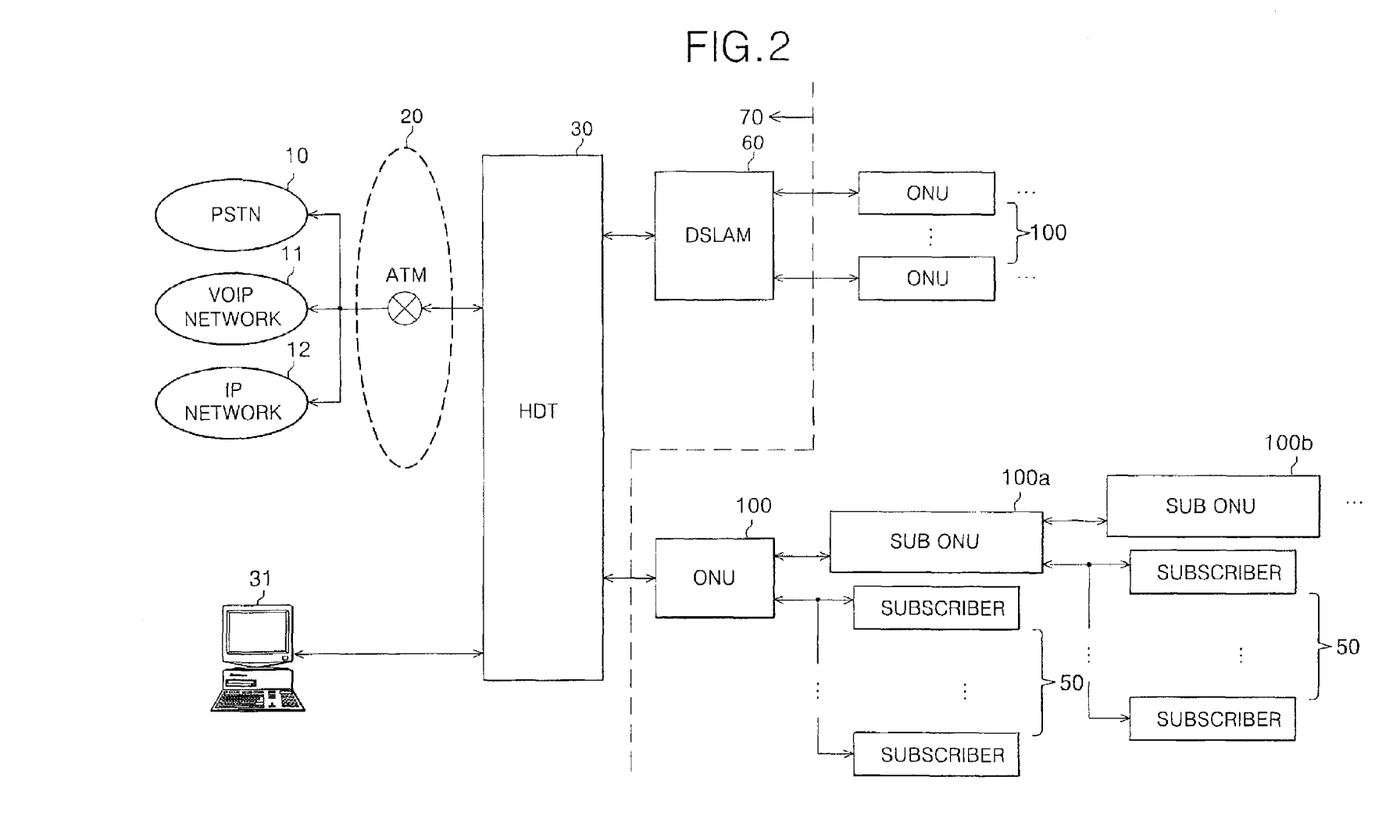
FIG. 2 is a schematic diagram illustrating network configuration of the high-speed data service system having an optical network unit ONU of a preferred embodiment according to the present invention.

FIG. 2 is a schematic diagram illustrating network configuration of the high-speed data service system having an optical network unit ONU of a preferred embodiment according to the present invention.

Referring to FIG. 2, the high-speed data service system includes a host digital terminal HDT 30 for connecting a predetermined signal data interface through an ATM network 20, a host digital terminal HDT controller 31 for controlling and monitoring the HDT 30, a digital subscriber line access multiplexor DSLAM 60 linking with the HDT 30, and multiple optical network units ONU 100. In this case, the ATM network 20 links with a public switched telephone network PSTN 10, a voice over internet protocol voIP network 11, an Internet protocol IP network 12, and so on.

The ONU 100 is connected to a backbone network 70 through the HDT 30 and an optical cable by a way of synchronous transfer mode 1 STM-1, a symmetric high speed digital subscriber line SHDSL, an inverse multiplexing for ATM IMA, a digital service level 3 DS3, or an E1/T1 interface (E1 being a European digital transmission format and T1 being a digital transmission standard in for example North America that carries a digital signal level-1 (DS1)), and so on. The ONU 100 is also connected to multiple subscribers 50 through a twisted pair TP subscriber line. Therefore, duplex data transmission is performed between the backbone network 70 and the subscribers 50 so that the ONU 100 can perform a function of a subscriber concentration based on the ATM (asynchronous transfer mode) cell.

Further, the optical network unit ONU 100 performs the above described function, while the ONU 100 is connected to the DSLAM 60 linking with the HDT 30 according to the required network configuration. As shown in FIG. 2, the ONU 100 is connected to sub ONUs (sub-optical network units) 100a, 100b etc., through a network topology of a daisy chain method, connecting the ONUs with phases, so that the ONU 100 can be connected to more subscribers 50 efficiently.

Figure 3:
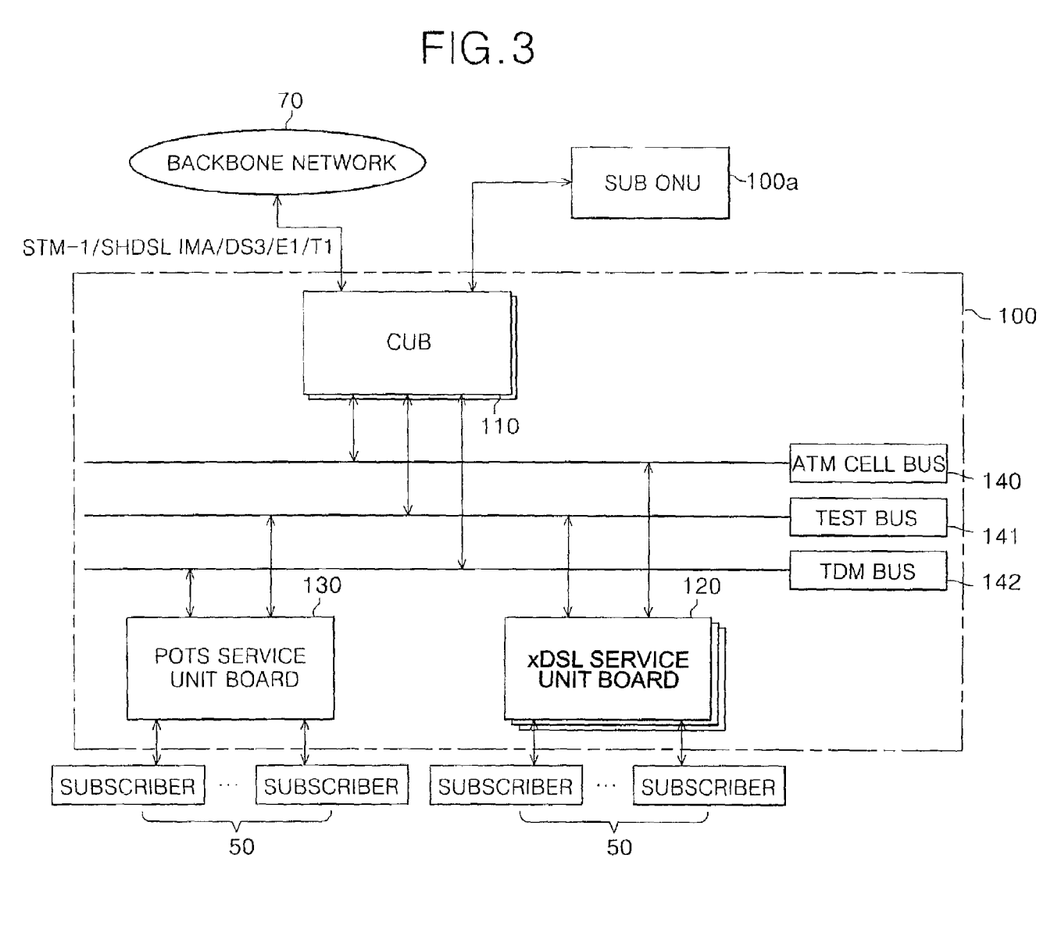
FIG. 3 is a block diagram illustrating a configuration of the ONU of the present invention.
Figure 4:
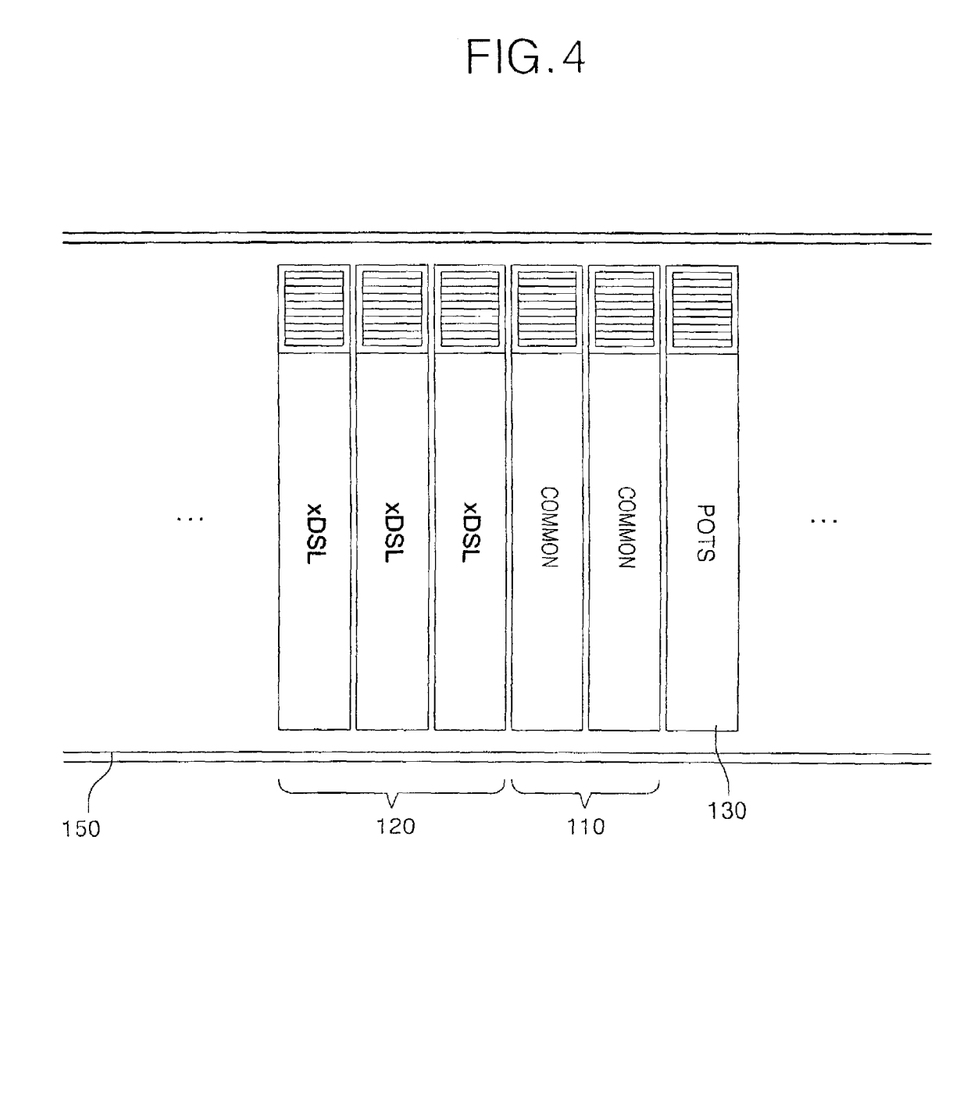
FIG. 4 is a plain diagram illustrating packaging states of each unit board for the ONU of FIG. 3.

FIG. 3 is a block diagram illustrating a configuration of the ONU of the present invention and FIG. 4 is a plan diagram illustrating packaging states of each unit board for the ONU of FIG. 3.

Referring to FIGS. 3 and 4, the ONU 100 of the present invention includes a common unit board CUB 110, multiple xDSL service unit boards 120, a POTS service unit board 130, and a shelf 150 for packaging these unit boards.

The shelf 150 including a plurality of slots for plugging-in multiple unit boards has a normal shelf configuration with a board connector, a guide rail, and a front panel. Normally, the shelf 150 has a width of 19 inches, a height of 132 mm and a depth of 427.7 mm. However, the size of the shelf 150 can be varied.

As shown in FIG. 4, the shelf 150 normally includes two CUBs 110 for duplication, a POTS service board 130, and one to three xDSL service unit boards 120 variably according to density degrees of the subscribers.

Additionally, the packaged unit boards 110, 120, and 130 can exchange data mutually through common buses 140, 141, 142 packaged in the shelf 150. The common buses include an ATM cell bus 140, a test bus 141, and a time-division multiplexing TDM bus 142. The ATM cell bus 140 exchanges an ATM cell between the CUB 110 and the xDSL service unit board 120. The test bus 141 exchanges test data between the CUB 110 and the xDSL service unit board 120, the POTS service board 130. Furthermore, the TDM bus 142 exchanges a voice TDM signal for POTS service between the CUB 110 and the POTS service unit board 130.

Figure 5:
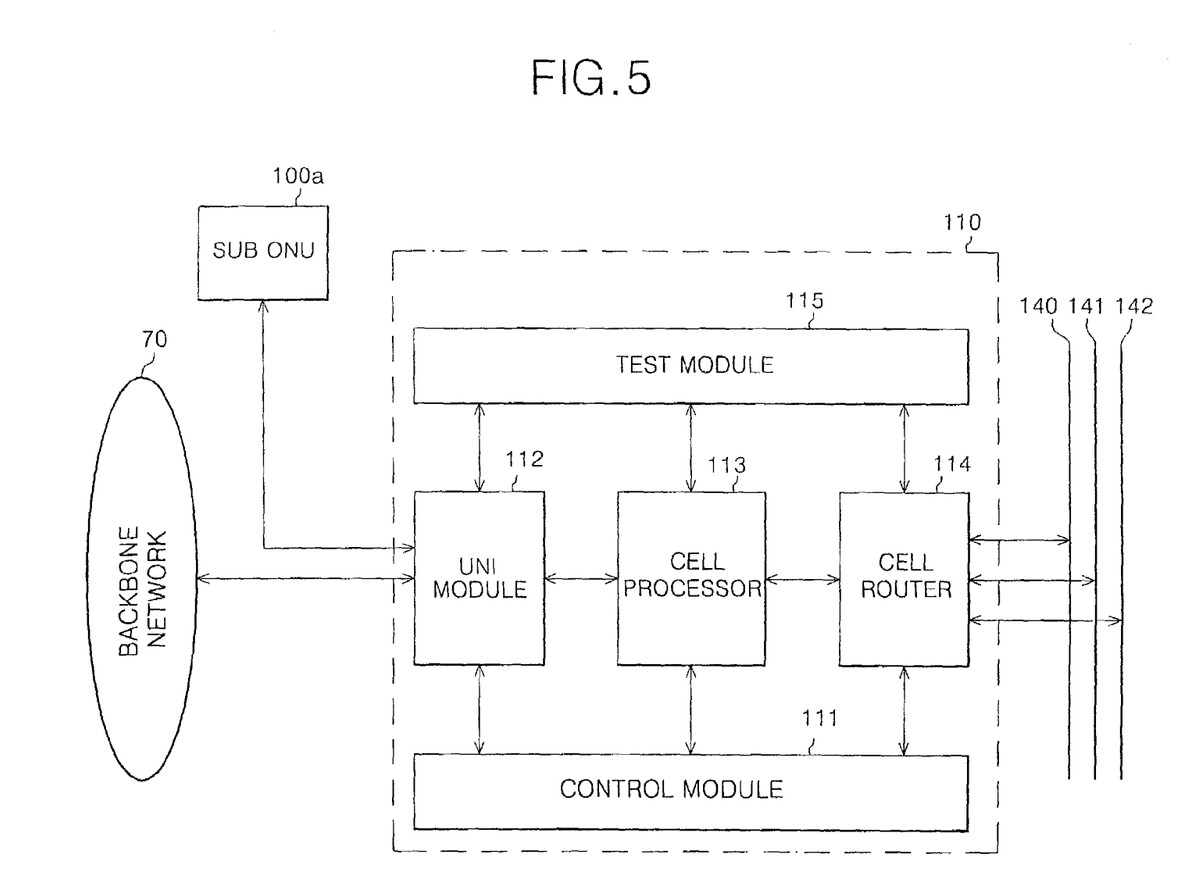
FIG. 5 is a block diagram illustrating a configuration of a common unit board CUB according to the preferred embodiment of the present invention.

Meanwhile, the CUB 110 performs a control function for the units 110, 120, 130 and the common buses 140, 141, 142, a network interface function to the backbone network 70, a cell processing function, and a test function. The CUB 110 includes an inside module including an application specific integrated circuit ASIC, and the configuration of the ASIC is illustrated in FIG. 5.

A unit network interface UNI 112 module includes a plurality of network ports connected to the backbone network 70 through the optical cable, and a plurality of sub connecting ports connected to the sub ONUs 100a, 100b, etc. The UNI 112 module performs a physical layer function, such as photo/electric conversion and an ATM cell extraction, for duplex data transmissions through the network ports by a way of STM-1, SHDSL, IMA, DS3, or E1/T1 signal.

A cell processor 113 for exchanging an ATM cell with the UNI module 112 is connected to the cell router 114. The cell processor 113 performs functions of multiplexing and inverse-multiplexing a voice TDM signal including a full-duplex ATM cell and POTS service data, converting an ATM head for virtual pass connection VPC of the full-duplex ATM cell, and managing a traffic of the full-duplex ATM cell. Moreover, the cell processor 113 performs a real time operation, administration and maintenance OAM for the full-duplex ATM cell.

A cell router 114 transmits the ATM cell from the cell processor 113 to the ATM cell bus 140, or vice versa.

A test module 115 selects a data transmission path for an ATM cell, and applies a test signal to the data transmission path. Sequentially, by comparing the test results with pre-setting values for each of test items, the test module 115 decides whether the data transmission path is in normal state or not.

The test module 115, including 8260 central processing unit CPU, controls mutual operations, among the modules 112, 113, 114, 115, and various management data flows or transmission paths, such as the full-duplex ATM cell and an OAM data.

Therefore, the CUB 110 as a single board that includes the UNI 112, the cell processor 113, the test module 115, and the control module 111. The UNI is connected to the backbone network 70 to transmit data through an interface, and the cell processor 113 multiplexes an ATM cell and a voice TDM signal or vice versa. Further, the test module 115 performs various tests for the data transmission path, and the control module 111 controls entire operations and data flows of the ONU 100. Accordingly, it is possible to develop an inexpensive ONU with a simplified configuration.

The POTS service unit board 130, connected to the TDM bus 142, converts the voice TDM signal transmitted from the cell processor 113 into an analog signal, and provides the analog signal for the subscribers 50 through a telecommunication line, or vice versa. For example, the POTS service unit board 130 has 64 subscriber connecting ports for controlling 64 channels.

The xDSL service unit board 120, connected to the ATM cell bus 140, converts an ATM cell of the backbone network 70 transmitted from the cell router 114 to an analog signal. Sequentially, the xDSL service unit board 120 performs split functions for separating a high frequency component for data area and a low frequency component for voice area, and these components are transmitted to the subscribers 50 through the telecommunication line. Additionally, for example, the xDSL service unit board 120 has 32 subscriber connecting ports for controlling 32 channels. However, as described in the above statement, because the shelf 150 packages one to three xDSL service unit boards 120 according to the density degree of the subscribers, the ONU 100 can control a maximum of 96 channels.

Figure 6:
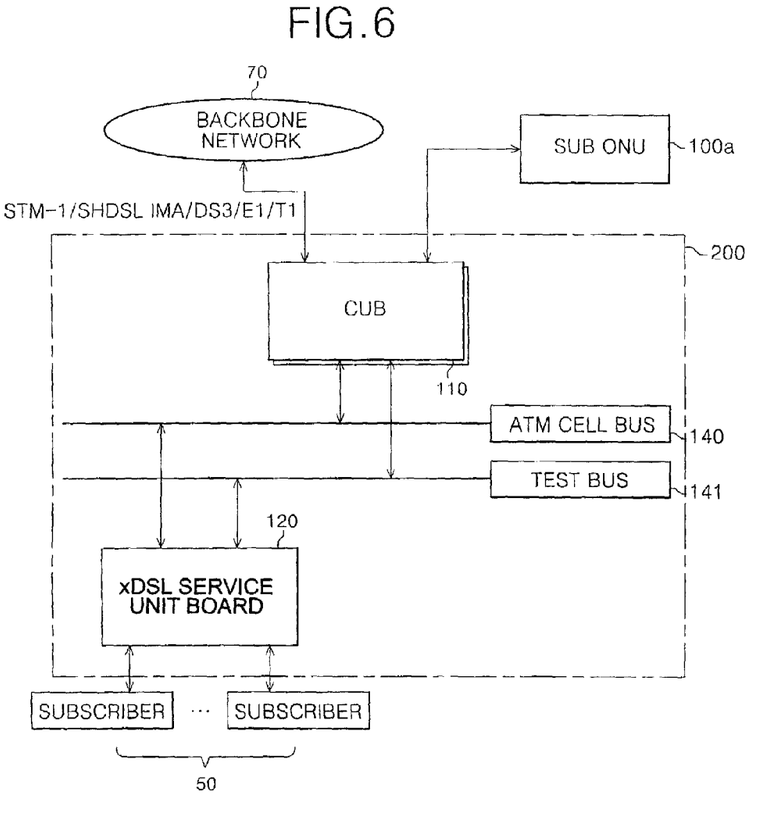
FIG. 6 is a block diagram illustrating a configuration of a mini-ONU according to another preferred embodiment of the present invention.

On the other hand, when a degree of service requirement is low, the subscribers are dispersed in an inhabited area, such as farming and fishing communities, or an inexpensive ONU is required, it is possible to install mini-ONU of FIG. 6 according to another preferred embodiment of the present invention.

FIG. 6 is a block diagram illustrating a configuration of a mini-ONU according to another preferred embodiment of the present invention.

Referring to FIG. 6, the mini-ONU 200 links the multi-functioned CUB 110 and the xDSL service unit board 120 with common buses 140 and 141 in a shelf.

The shelf is the same as the shelf shown in FIG. 4 and has a width of 19 inches, a height of 88 mm, and a depth of 427.7 mm. One of the common buses for linking the packaged unit boards is an ATM cell bus 140 for exchanging the ATM cell, and the other of the common buses is a test bus 141 for exchanging a test data.

The CUB 110 includes a UNI, a cell processor, a test module, a cell router, and a control module in the same way of the prior embodiment of the present invention of FIG. 5. The CUB 110 extracts an ATM cell from a STM-1, SHDSL, IMA, DS3 or E1/T1 signal transmitted from a backbone network 70, multiplexes the ATM cell through various cell processes, and transmits the ATM cell to an xDSL service unit board 120 through the ATM cell bus 140, or vice versa. Furthermore, the xDSL service unit board 120, including 32 subscriber connecting ports, performs various conversions and split functions to the ATM cell transmitted from the ATM cell bus 140, and thereof, transmits the ATM cell to the subscribers 50 through a telecommunication line interface.

The ONU 100 is the same as shown in FIG. 2 where one can install multiple sub ONUs 100a, 100b, and so on by the daisy chain method. When the cell processor 113 of the CUB 110 performs cell processing functions to the ATM cell transmitted from the UNI 112, the ATM cell having routing information for the sub ONUs 110a, 100b, and so on is transmitted to the sub ONUs 100a, 100b, and so on through connecting ports of the UNI 112. Accordingly, any additional device is not necessary to increase the number of subscribers.

As described in the above statements, an ONU of the present invention includes a common unit board with a chip, and links multiple xDSL and POTS service board installed in a shelf with a common bus, wherein the chip integrates a controller, a network interface, a cell processor, and a tester.

Therefore, it is possible to develop the simplified and efficient ONU, in low manufacturing costs, so that the ONU provides various interfaces, such as STM-1, SHDSL, IMA, DS3 or E1/T1, and test function.

Additionally, the ONU has an improved configuration in flexibility and expandability, by the variable package method of the service unit board and by the daisy chain method, so that the ONU can provide improved services according to density degree of the subscribers and the degree of service requirement.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical network unit, connected to a backbone network comprising a host digital terminal and a digital subscriber line access multiplexor of a high-speed data service system, and connected to multiple subscribers, for performing subscriber concentration functions, the optical network unit comprising:
   a common unit board, interfaced with the backbone network, for extracting an asynchronous transfer mode cell, performing a full-duplex asynchronous transfer mode cell processing function, performing a transmission test for the asynchronous transfer mode cell and associated data, and controlling mutual operations among each of the unit boards and data flows;
   multiple digital subscriber line service unit boards for performing a subscriber interface after converting the asynchronous transfer mode cell from the common unit board to an analog signal, for dividing the asynchronous transfer mode cell into a high frequency component for data area and a low frequency component for a voice area, and for transmitting the asynchronous transfer mode cell to the subscribers, or vice versa; and
   a shelf comprising multiple slots for plugging-in multiple unit boards, and for linking packaged unit boards with a common bus in the shelf.

2. The optical network unit according to claim 1, further comprised of two common unit boards being packaged in the shelf for duplication and between one and three of the multiple digital subscriber line service unit boards being variably packaged in the shelf according to the density degree of the connected subscribers.

3. The optical network unit according to claim 1, the common bus comprising:
   an asynchronous transfer mode cell bus for exchanging the asynchronous transfer mode cell between the common unit board and the multiple digital subscriber line service unit boards; and
   a test bus for exchanging test data among the common unit board and the multiple digital subscriber line service unit boards.

4. The optical network unit according to claim 1, further comprising a plain old telephone service unit board performing a subscriber interface after converting a voice time-division multiplexing signal from the common unit board to an analog signal, and for transmitting the signal to the subscribers, or vice versa.

5. The optical network unit according to claim 4, the plain old telephone service unit board comprising 64 subscriber connecting ports for controlling 64 channels.

6. The optical network unit according to claim 3, the common bus further comprising a time-division multiplexing bus exchanging the voice time-division multiplexing signal for plain old telephone services between the common unit board and the plain old telephone service unit board.

7. The optical network unit according to claim 4, the common bus further comprising a time-division multiplexing bus exchanging the voice time-division multiplexing signal for plain old telephone services between the common unit board and the plain old telephone service unit board.

8. The optical network unit according to claim 1, the common unit board being connected to the backbone network through an interface.

9. The optical network unit according to claim 8, the interface being one of synchronous transfer mode 1, symmetric high speed digital subscriber line, inverse multiplexing for asynchronous transfer mode, digital service level 3 and E1/T1.

10. The optical network unit according to claim 1, the common unit board comprising:
   a universal network interface module comprising multiple network connecting ports connected to the backbone network through optical cables, and for performing a function of an optical/electric interface and the asynchronous transfer mode cell extraction to transmit full-duplex data signals to the backbone network;
   a cell processor module for exchanging mutually the asynchronous transfer mode cell with the universal network interface module, for multiplexing the voice time-division multiplexing signal including full-duplex asynchronous transfer mode cell and plain old telephone service data or vice versa, for converting an asynchronous transfer mode header for virtual path connection of the full-duplex asynchronous transfer mode cell, for managing the full-duplex asynchronous transfer mode cell traffic, and for performing a function of a real time operation, administration and maintenance. for the full-duplex asynchronous transfer mode cell;
   a cell router for transmitting the asynchronous transfer mode cell from the cell processor module to the asynchronous transfer mode cell bus, or vice versa;
   a test module for selecting a transmission path for the asynchronous transfer mode cell and associated data, for applying a test signal to the selected path, and for comparing the test results with preset values of each of the test items to decide whether the transmission path is operated in normal or not; and
   a control module for controlling mutual operations among the modules, and transmission flows of the full-duplex asynchronous transfer mode cell and associated data, with the universal network interface module, cell processor module, cell router, test module, and control module being an integrated chip.

11. The optical network unit according to claim 10, the universal network interface module of the common unit board, including connecting ports for connecting another optical network unit as a sub unit, being connected to the sub unit through the connecting ports by the network topology of a daisy chain method.

12. The optical network unit according to claim 1, the shelf including a width of inches, a height of 132 mm, and a depth of 427.7 mm.

13. The optical network unit according to claim 1, the shelf including a width of inches, a height of 88 mm, and a depth of 427.7 mm.

14. The optical network unit according to claim 1, the multiple digital subscriber line service unit board comprising 32 subscriber connecting ports for controlling 32 channels.

15. A method for an optical network unit connected to a backbone network, the method comprising:
   interfacing by a first unit board with the backbone network;
   extracting an asynchronous transfer mode cell by the first unit board;
   performing a full-duplex asynchronous transfer mode cell processing function by the first unit board;
   performing a transmission test for the asynchronous transfer mode cell and associated data by the first unit board,
   controlling mutual operations among each of the unit boards and data flows by the first unit board;
   performing a subscriber interface after converting the asynchronous transfer mode cell from the first unit board to an analog signal by first service unit boards;
   dividing the asynchronous transfer mode cell into a high frequency component for data area and a low frequency component for a voice area, and transmitting the asynchronous transfer mode cell to the subscribers by the first service unit boards, or vice versa; and
   plugging in the first unit board and first service unit boards into a shelf and linking the first unit board and the first service unit boards with a common bus in the shelf.

16. The method according to claim 15, further comprising of performing a subscriber interface after converting a voice time-division multiplexing signal from the first unit board to an analog signal, and for transmitting the signal to the subscribers by a second service unit board, or vice versa.

17. The method according to claim 16, further comprising of exchanging the voice time-division multiplexing signal for plain old telephone services between the first unit board and the second service unit board by a bus included in the common bus.

* * * * *